Oct. 6, 1970 H. KRASSIN ET AL 3,532,946
SEMICONDUCTOR ELEMENT HAVING pnpn STRUCTURE
AND BEVELLED LATERAL SURFACE
Filed Jan. 11, 1968
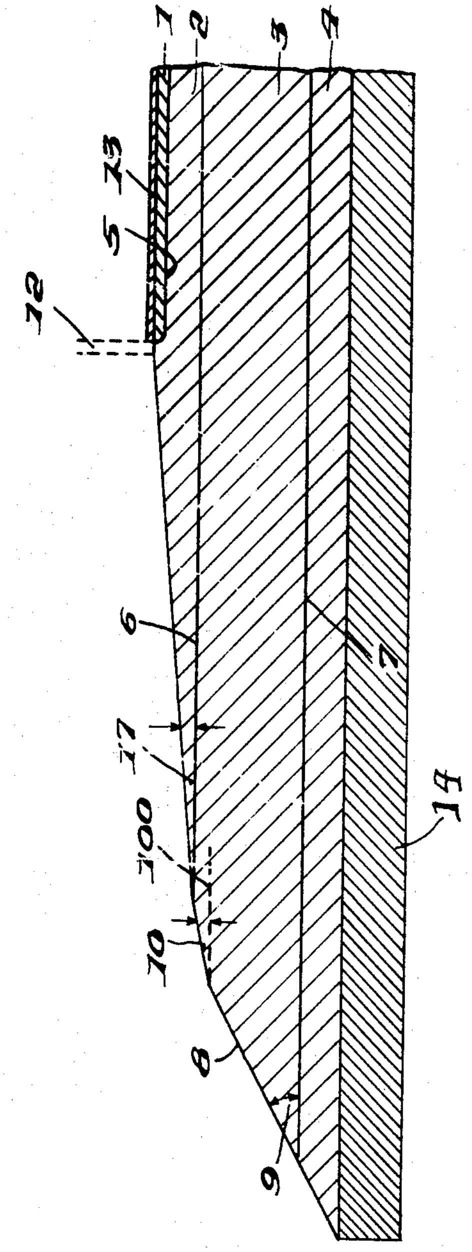
INVENTOR
Horst Krassin - Elmar Müller
Horst Riess - Bernhard Voss
Klaus Weimann
BY Pierce, Scheffler & Parker
ATTORNEYS United States Patent Office 3,532,946
Patented Oct. 6, 1970

3,532,946
SEMICONDUCTOR ELEMENT HAVING pnpn STRUCTURE AND BEVELLED LATERAL SURFACE Horst Krassin, Lampertheim, Elmar Müller, Alzey, Horst Riess, Lampertheim, Bernhard Voss, Virenheim, and Klaus Weimann, Lampertheim, Germany, assignors to Aktiengesellschaft Brown, Boveri & Cie, Baden, Switzerland, a joint-stock company Filed Jan. 11, 1968, Ser. No. 697,207
Claims priority, application Germany, Jan. 26, 1967, B 90,903
Int. Cl. H01l *11/10*
U.S. Cl. 317—235 1 Claim

ABSTRACT OF THE DISCLOSURE

A semiconductor element having a pnpn structure has at least one control electrode and two main electrodes at the opposite face of the element. The lateral surface of the element is bevelled at different angles, there being two outer portions of this surface which lie at different angles to the junction planes between the various zones of the element, and an intermediate surface portion which lies at an angle to the junction planes and having a magnitude intermediate the magnitudes of the angles correlated to the two outer surface portions. The bevel angle of one of the two outer surface portions lies between 20 and 35°, for example 30°, the bevel angle of the other outer surface portion is 2° and the bevel angle of the intermediate surface portion lies between 3° and 5°. Due to the three-angle bevel of the lateral surface, the blocking losses of the semiconductor element are less due to lower blocking current and accordingly the heating effect is lessened.

This invention relates to semiconductor devices. According to the invention, there is provided a semiconductor device comprising a semiconductor element having a pnpn structure and having at least one control electrode and two main electrodes, the lateral surface of the element being bevelled so that in section transverse of the junctions of the element the lateral surface is defined by two outer portions at different angles to the junctions, and a portion intermediate said portions at an angle of magnitude intermediate the magnitudes of the angles of said different angles.

When the semiconductor device is poled in the pass-through direction, the blocked central pn-junction between the two base zones has a lower blocking current than previously known constructions of semiconductor devices, due to the bevel of the lateral surface at three different angles in accordance with the invention. This results in lower blocking losses and in less heating of the semiconductor device according to the invention, as compared to previously known semiconductor structures.

Also, the portion at the least angle to the junctions includes a part in the region of the outer zone adjacent said other inner zone, which extends parallel to an outer surface of said outer zone.

The semiconductor device is produced by a process which resides in that, starting from a pnpn element produced by diffusion, the three angles are produced by grinding with the aid of dome-shaped grinding shells of differing radius.

In this connection, it is advantageous to proceed by producing the largest angle first and the smallest angle last. It is expedient to provide the semiconductor structural element before grinding with a solderable metal coating over the whole surface. After grinding, the semiconductor structural element is etched in intrinsically known fashion in order to eliminate the destroyed surface region.

Further features and advantages of the invention will be apparent from the following description of an embodiment thereof given, by way of example only, in conjunction with the accompanying drawing, which shows diagrammatically in part section transverse of the junction a semiconductor device according to the invention.

The device comprises a semiconductor element having a pnpn structure 1 to 4 and having at least one control electrode and two main electrodes, the lateral surface 8 of the element is bevelled so that in section transverse of the junctions of the element, as in the figure, the lateral surface is defined by two outer portions at different angles to the junctions, and a portion intermediate said portions at an angle of magnitude intermediate the magnitudes of the angles of the different angles.

The zones of the element comprise the emitter 1 or outer zone with $n^+$ doping, the neighboring base or inner zone 2 with p doping, the second base or inner zone 3 with n doping, the net activator concentration of the last-named base zone being lower than that of the base zone 2, and the collector or outer zone 4 with p or $p^+$ doping in the outer edge region. The pn junctions 5, 6 and 7 are disposed between the said zones. One outer portion of the lateral surface 8 of the semiconductor element is bevelled so as to be at an angle 9 of from 20° to 35°, for example, 30° to the pn junction 7 and extends across the outer zone 4 and a portion of inner zone 3. The greater the difference in doping concentrations between zones 3 and 4, the smaller must this angle be. The other outer portion of the lateral surface 8 is at an angle 11 of approximately 2° to the pn junction 6, and extends substantially across the inner zone 2; the intermediate portion of the lateral surface 8 connects and extends between the outer portions and is at an angle 10 of from 3° to 5° to an imaginary parallel 100 to the neighboring pn junction 6. Here also, the magnitude of the angle again depends on the difference in doping concentration of the neighboring zones—namely the base zones 2 and 3.

The base zone 2 has, adjacent to the outer border of the emitter 1 an annular surface region 12 extending parallel to the one main electrode (cathode) 13 which covers the emitter 1, with the result that a lower surface field strength is achieved in this region. The other main electrode (anode) 14 is soldered to the collector zone 4.

The semiconductor-disc is provided at its front surface at the cathode ring with a central control electrode (not shown) being encircled by the emitter 1, a border region of which is shown in the drawing, extending over an annular area at the same front surface.

The semiconductor element is produced in known fashion by diffusion in the form of a flat circular disc from a silicon monocrystal with n conductivity. The pnpn element is thereafter advantageously provided with a nickel coating not illustrated in the drawing, and fastened with picene or otherwise to a cylinder of the same diameter made of etch-resistant material. The three angles are then successively produced in three operations by grinding in three dome-shaped grinding shells of differing radius. If the disc-shaped semi-conductor element has a diameter of 22 mm., a dome-radius of 25 mm. is required in order to produce the angle of 30°. For an angle 2.5°, the dome must have a radius of 290 mm. It is advantageous to grind on the largest angle first and the smallest angle last. After grinding the surface regions the moncristalin structure of which being destroyed by the grinding must be removed by etching with known etching solutions. In this connection, it is expedient to etch to a depth of about 25$\mu$.

The semiconductor element is built into a housing in the usual fashion after having been detached from the cylinder.

We claim:

1. A semiconductor device comprising a semiconductor element having at least four contiguous zones alternating in conductivity type, said zones being constituted respectively by an outer zone serving as a collector, a first inner base zone contiguous to said collector zone and forming a first p-n junction therebetween, a second inner base zone contiguous to said first inner base zone and forming a second p-n junction therebetween, and another outer zone which serves as an emitter contiguous to said second inner base zone and forming a third p-n junction, said first and second p-n junctions being parallel to each other and extending to the side surface of said semiconductor element, and said side surface being constituted by three contiguous bevelled portions wherein the first bevelled portion extends for the full thickness of said outer collector zone and a portion of the thickness of said first inner base zone at an angle of between 20 and 35 degrees to the plane of said p-n junction, wherein said second bevelled portion extends for the remaining portion of the thickness of said first inner base zone to the intersection of said second p-n junction with the side surface at an angle of between 3 and 5 degrees to the plane of said second p-n junction, and wherein said third bevelled portion extends towards said emitter zone from the intersection of said second p-n junction with the side surface at an angle of about 2 degrees.

References Cited

UNITED STATES PATENTS

| | | | |
|---|---|---|---|
| 3,307,240 | 3/1967 | Ginsbach et al. | 317—235 |
| 3,361,943 | 1/1968 | Knott et al. | 317—235 |

FOREIGN PATENTS

| | | |
|---|---|---|
| 1,052,661 | 12/1966 | Great Britain. |

JERRY D. CRAIG, Primary Examiner